(12) United States Patent
Chen et al.

(10) Patent No.: US 7,054,148 B2
(45) Date of Patent: May 30, 2006

(54) CRADLE APPARATUS WITH BUILT-IN SCANNING MODULE

(75) Inventors: Hanks Chen, Yungho (TW); Chi Nan Wang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 281 days.

(21) Appl. No.: 10/687,883

(22) Filed: Oct. 20, 2003

(65) Prior Publication Data
US 2005/0002160 A1  Jan. 6, 2005

(30) Foreign Application Priority Data
Jul. 1, 2003  (TW) .............................. 92212136 U

(51) Int. Cl.
*G06F 1/16* (2006.01)
(52) U.S. Cl. ...................... 361/683; 361/686; 345/173; 382/313
(58) Field of Classification Search ................ 361/679, 361/683; 235/439, 454, 462.43; 248/126, 248/127, 136; 320/107, 114, 115; 382/181, 382/318, 321, 317; 250/228, 234; 385/86, 385/89, 92–94; 710/129
See application file for complete search history.

(56) References Cited

U.S. PATENT DOCUMENTS

| | | | | |
|---|---|---|---|---|
| 5,536,930 A | * | 7/1996 | Barkan et al. | 235/472.01 |
| 6,065,880 A | * | 5/2000 | Thompson | 385/88 |
| 6,509,715 B1 | * | 1/2003 | LaRue | 320/107 |
| 6,789,734 B1 | * | 9/2004 | Tu | 235/441 |
| 6,837,435 B1 | * | 1/2005 | Kehoe et al. | 235/472.01 |
| 6,891,979 B1 | * | 5/2005 | Hu et al. | 382/313 |
| 6,944,782 B1 | * | 9/2005 | von Mueller et al. | 713/320 |
| 2001/0034803 A1 | * | 10/2001 | Sorek et al. | 710/129 |
| 2004/0028295 A1 | * | 2/2004 | Allen et al. | 382/313 |

* cited by examiner

*Primary Examiner*—Michael Datskovskiy
(74) *Attorney, Agent, or Firm*—Birch,Stewart,Kolasch & Birch, LLP

(57) ABSTRACT

A cradle apparatus includes a built-in scanning module, and is used for mounting a portable electronic device. The cradle apparatus includes a housing and a scanning module. The housing has an accommodating slot with a connector therein and a transparent scanning region on the bottom thereof, below which the scanning module is placed. When a portable electronic device is connected to the connector of the cradle apparatus, the portable electronic device can control the scanning module to scan a document placed atop the transparent scanning region.

15 Claims, 7 Drawing Sheets

CRADLE APPARATUS WITH BUILT-IN SCANNING MODULE

This nonprovisional application claims priority under 35 U.S.C. § 119(a) on Patent Application No(s). 92212136 filed in TAIWAN on Jul. 1, 2003, which is herein incorporated by reference.

BACKGROUND OF THE INVENTION

1. Field of the Invention

The present invention relates to a cradle apparatus with a built-in scanning module and, more particularly, to a cradle used for mounting a portable electronic device to accomplish the scanning function.

2. Description of Related Art

Recently, personal digital assistants (PDA) have become very popular electronic products. Because PDAs have powerful functions as the result of many years of development, and are small in size and thus can be taken along conveniently, many businessmen now consider the PDA an indispensable personal electronic tool.

As stated above, PDAs have powerful functions, and can store several sets of customer data such as telephone numbers, fax numbers, email addresses, and even personal to-do lists. Moreover, a PDA can be mounted in a cradle apparatus to exchange data with a computer or to be charged via the cradle apparatus.

Although PDAs have many functions, scanning, for direct scan of documents or business cards to avoid the trouble of manual input of data, has not yet been integrated into PDAs or cradle apparatuses. Moreover, documents with non-text data (e.g., pictures) can't be scanned into image data for quick storage.

SUMMARY OF THE INVENTION

The primary object of the present invention is to provide a cradle apparatus with a built-in scanning module to allow users of portable electronic devices to scan document data or pictures in real time.

Another object of the present invention is to provide a cradle apparatus with a built-in scanning module and having two working modes: the handheld scan and the automatic paper-feed scan.

To achieve the above objects, the present invention provides a cradle apparatus with a built-in scanning module for mounting a portable electronic device therein. The cradle apparatus includes a housing, a scanning module and a displacement detection module. The housing has a connector therein for connection with the portable electronic device. The housing also has a transparent scanning region. The scanning module is arranged in the transparent scanning region and used to scan a document and thereby generate image data. The displacement detection module is installed in the housing, and is composed of a first optical detector and a second optical detector, these being used to detect position and angle variations of the housing. The portable electronic device sends a scan control command to the scanning module via the connector, and the scanning result is then stored in the portable electronic device.

To achieve the above objects, the present invention also provides a cradle apparatus with a built-in scanning module, further having a base provided. The base can be selectively connected with the housing. The base has a input paper tray and a roller to allow the housing to provide automatic paper-feed scan after connection with the base.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
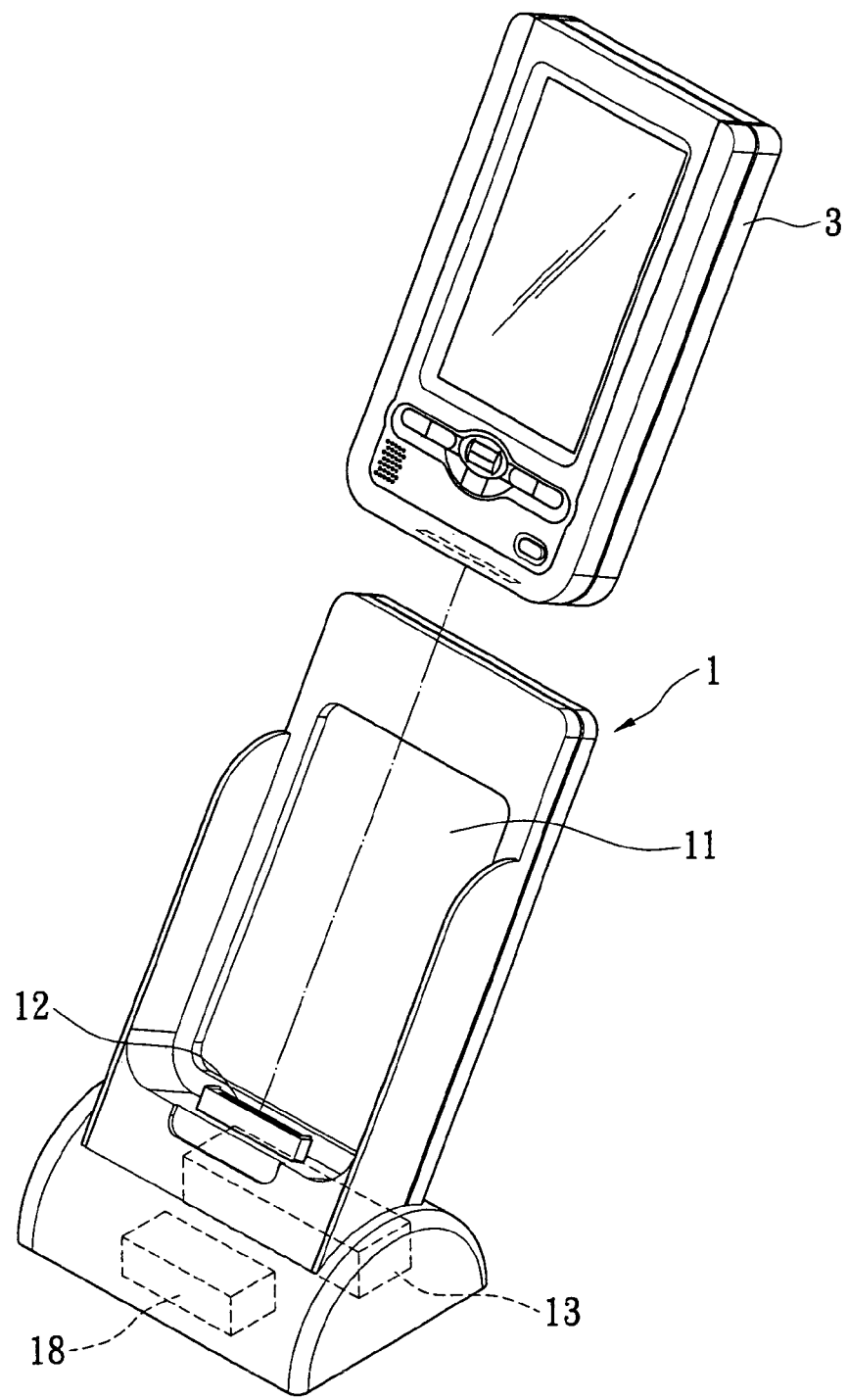
FIG. 1 is a perspective view of the preferred embodiment of the present invention.
Figure 2:
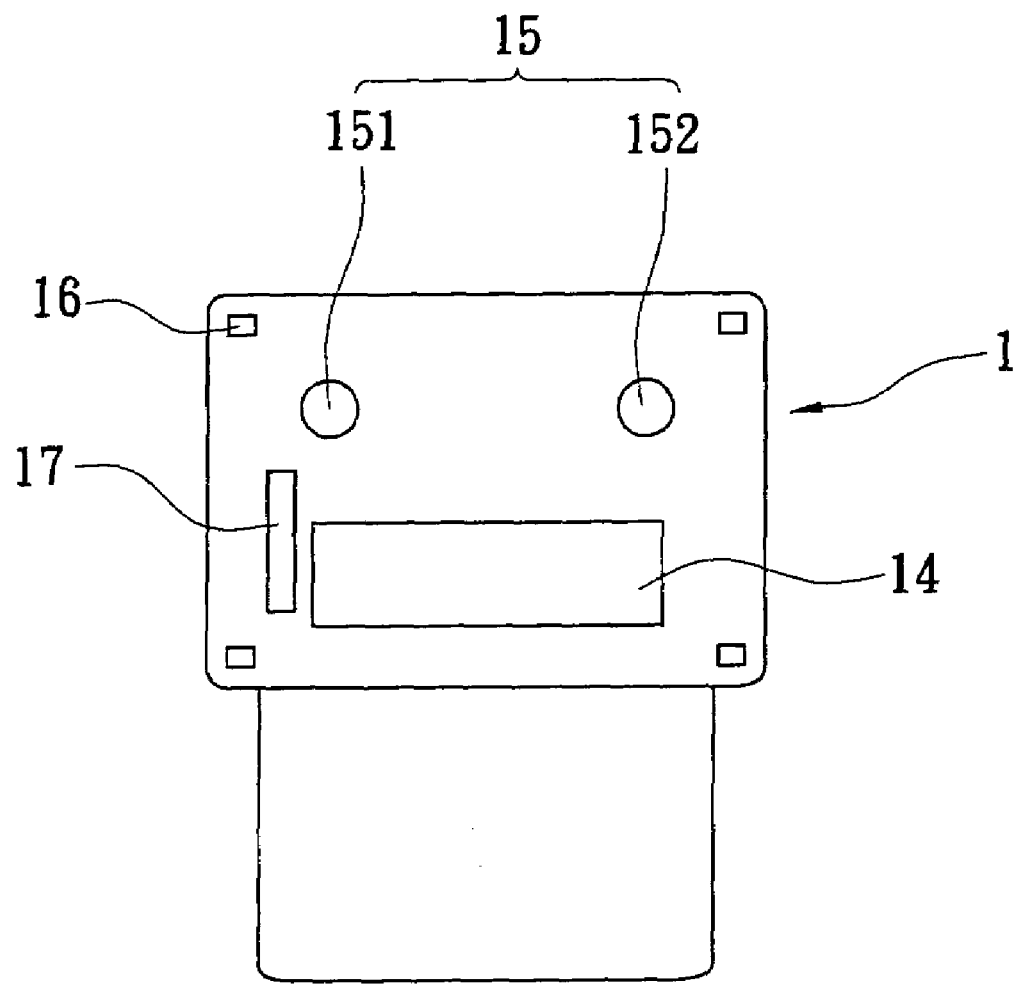
FIG. 2 is a bottom view of the preferred embodiment of the present invention.

As shown in FIGS. 1 and 2, the present invention provides a cradle apparatus with a built-in scanning module for mounting a portable electronic device therein. In this embodiment, the portable electronic device is a personal digital assistant (PDA) 3. The cradle apparatus includes a housing 1 and a scanning module 13.

The housing 1 has an accommodating slot 11 with a connector 12 therein as well as a charging module 18. The personal digital assistant 3 is mounted in the connector 12 for data transmission or charging. A transparent scanning region 14, a displacement detection module 15, a plurality of fastening grooves 16 and a first connector 17 are provided on the bottom of the housing 1. The scanning module 13 in the housing 1 can perform document or picture scanning through the transparent scanning region 14. The displacement detection module 15 is installed in the same side of the housing 1 as the transparent scanning region 14 to detect position and angle variations of the housing when performing a handheld scan. The displacement detection module 15 is composed of a first optical detector 151 and a second optical detector 152, which are used to detect motions of the housing 1 for generation of a set of X- and Y-coordinates, respectively. These two sets of coordinates are then used to calculate out the position and angle variation of the housing 1. The PDA 3 can then amend the image data of the scanned document or picture for further processing of the image data, like, for example, character recognition after the scanning module 13 activates a scan.

Figure 3:
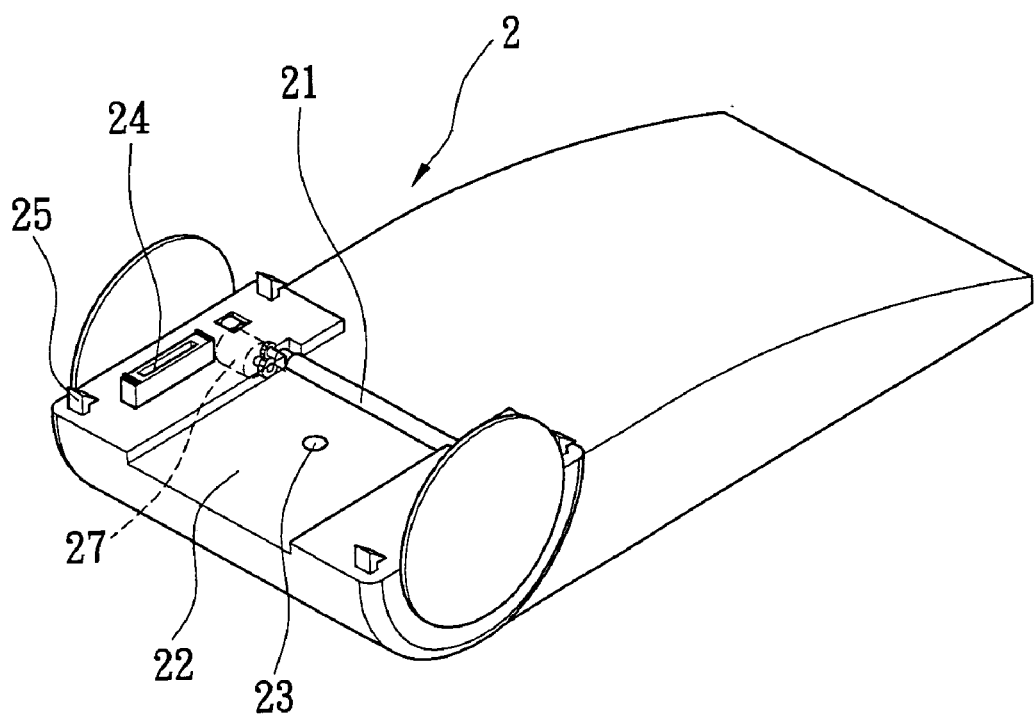
FIG. 3 is a view of a base of the present invention.

As shown in FIG. 3, the base 2 can be selectively connected at the bottom of the housing 1 to use the scanning module 13 together with the housing 1 and provide the function of automatic paper-feed scan. The base 2 has a roller 21, an input paper tray 22, a paper-in sensor 23, a second connector 24 and several fastening components 25. The base 2 has a motor 27 therein to turn the roller 21. The input paper tray 22 is arranged in front of the roller 21 for paper feeding. The paper-in sensor 23 is arranged in the paper-in direction of the input paper tray 22, and is used to detect the paper-fed situation of the input paper tray 22. The second connector 24 is connected with the first connector 17 in FIG. 2, and is used for receiving the control signal of the scanning module 13 and for transmission of electric power. The fastening components 25 are fastened to the fastening grooves 16 in FIG. 2 to connect the base 2 tightly to the housing 1 at the contacting face so that a user can perform automatic paper-feed scan via the input paper tray 22.

Figure 4:
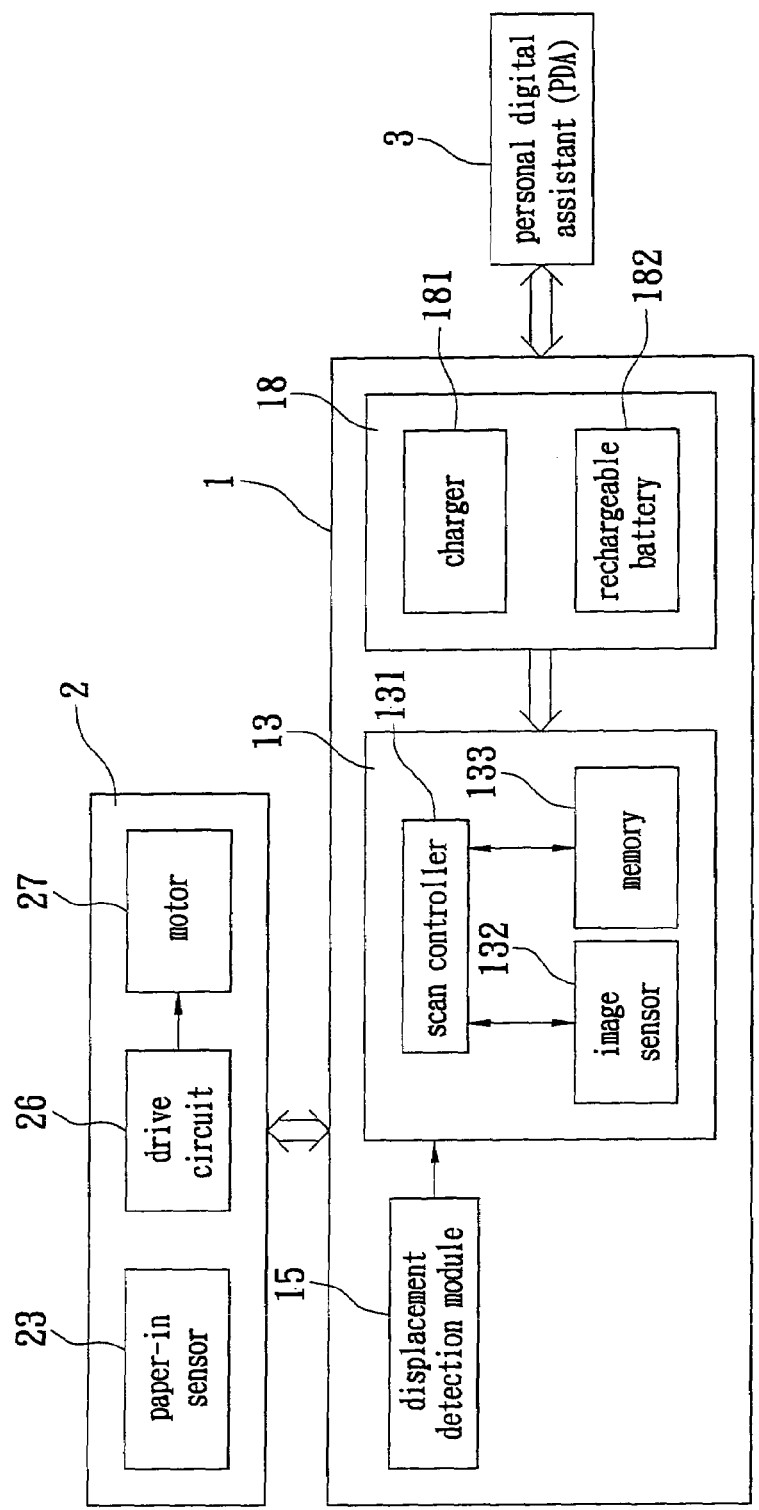
FIG. 4 is a circuit block diagram of the base of the present invention.

As shown in FIG. 4, a scan controller 131 of the scanning module 13 is used to determine whether the displacement detection module 15 detects any motion of the housing 1. If the answer is yes, an image sensor 132 of the scanning module 13 scans a document outside the transparent scanning region 14 into image data and temporarily stores the data into a memory 133. After scanning is finished, the image data are stored in the PDA 3. The charging module 18 is composed of a charger 181 and a rechargeable battery 182. The rechargeable battery 182 provides electric power for the scanning module 13. The charger 181 is used to charge the rechargeable battery 182 and the PDA 3.

When the base 2 is connected to the housing 1, the paper-in sensor 23 of the base 2 detects whether there is any paper entering and informs the scan controller 131. If paper is entering from the input paper tray 22, the scan controller 131 will send out a drive signal to a drive circuit 26 to drive the motor 27 and thereby turn the roller 22, hence feeding in paper from the input paper tray 22 for scanning.

Figure 5:
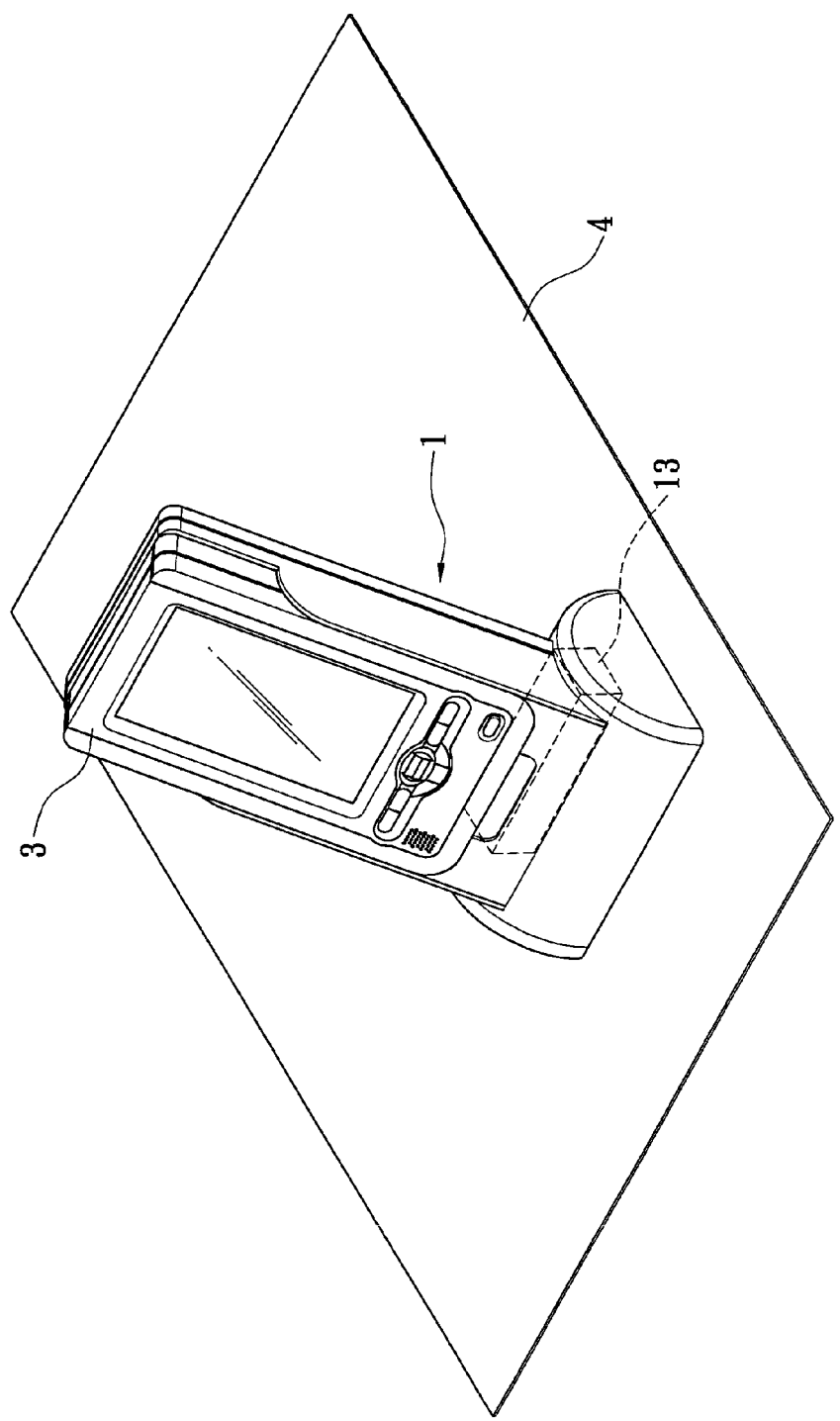
FIG. 5 is a diagram showing the present invention combined with a PDA for handheld scanning.

As shown in FIG. 5, when the PDA 3 is mounted with the housing 1, in addition to charging and data transmission, a handheld scan can also be performed through the scanning module 13 in the housing 1. In FIG. 5, a scan drive software is built into the PDA 3, and the scan control command is sent to the scanning module 13 via the connector 12 in FIG. 1 for scan. The scanning result is then stored into the PDA 3. After the housing 1 and the PDA 3 are combined together, the scanning module 13 built in the housing 1 allows a user hold the housing 1 to scan a paper 4. In order to ensure completion of a high-quality scan, the displacement detection module 15 in FIG. 2 is used to determine whether there is any motion of the housing 1 and the motion direction based on variation of the light intensity. If there is any motion, the scan controller 131 will control the image sensor 132 to read the detected paper image signals, thereby smoothing the image data obtained by means of handheld scan.

Figure 6:
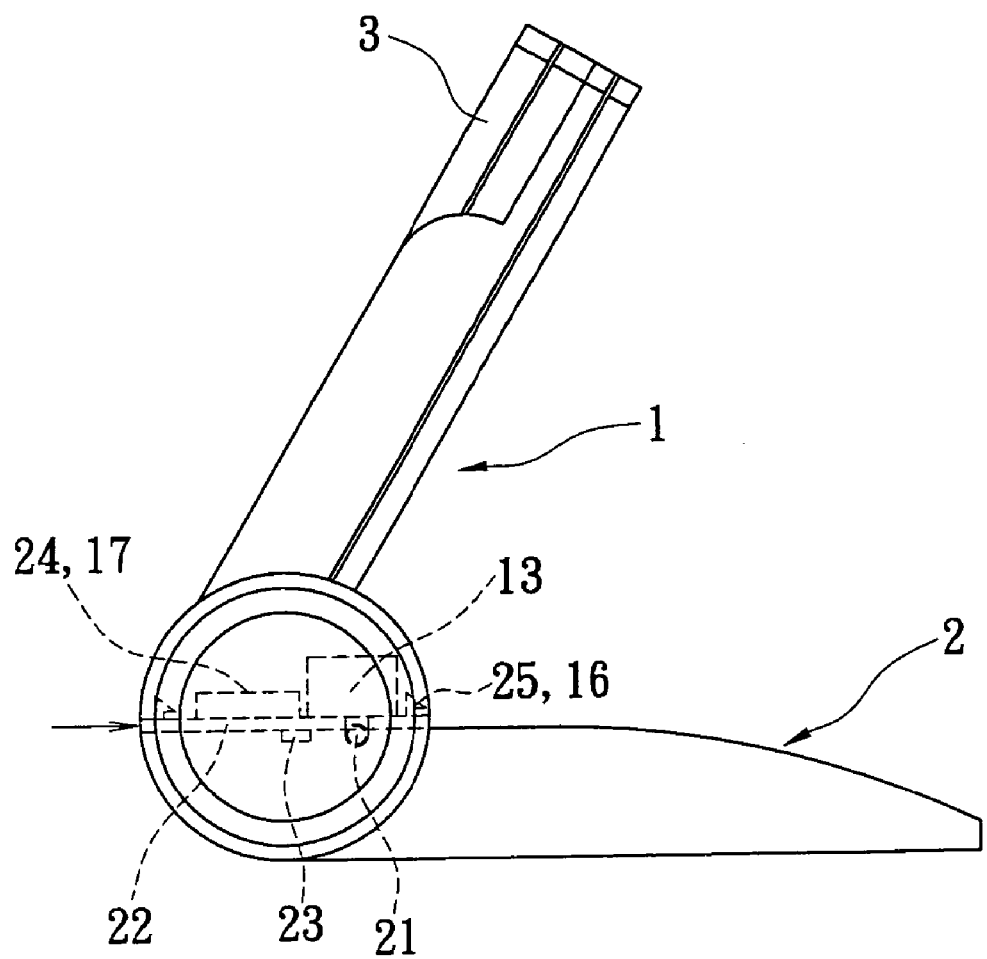
FIG. 6 is a side view of the present invention connected with a base.
Figure 7:
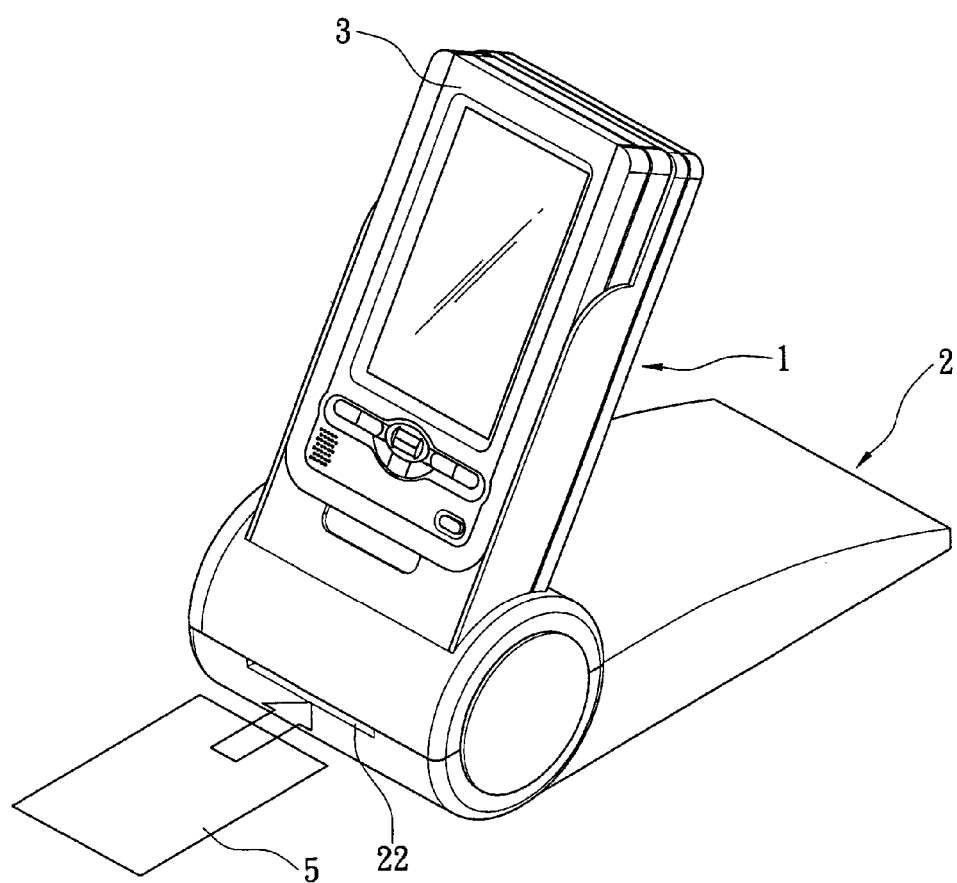
FIG. 7 is a diagram showing the present invention connected with a base and then combined with a PDA for automatic paper-feed scanning.

Reference is made to FIGS. 6 and 7 simultaneously. The base 2 is further connected at the bottom of the housing 1 in FIG. 5. After the PDA 3 is mounted in the housing 1, the base 2 connected at the bottom of the housing 1 can provide the function of automatic paper-feed scan. Because the housing 1 has been connected with the base 2, the scanning module 13 will switch from the handheld scan mode of FIG. 5 to the automatic paper-feed scan mode of FIG. 6. Because the base 2 is connected to the first connector 17 of the housing 1 via the second connector 24 to acquire power from the housing 1, the scanning module 13 can determine the pin voltage level variation in the first connector 17 to accomplish this automatic switch.

Therefore, it is only for the scanning module 13 to determine the pin voltage level variation in the first connector 17 to know whether the housing 1 is connected with the base 2. The scanning module 13 can thus automatically switch to the handheld scan mode or the automatic paper-feed scan mode.

After the scanning module 13 switches to the automatic paper-feed scan mode, the user can input a document from the input paper tray 22 (e.g., inputting a business card 5 into the input paper tray 22 in FIG. 7). When the paper-in sensor 23 detects the business card 5 on the input paper tray 22, the roller 21 will turn to draw one end of the business card 5 to the start position of scan. Next, the PDA 3 sends a scan control command to the scanning module 13, which will drive the roller 21 to turn to draw in the business card 5 for scanning. After the scan is finished, the image data of the business card 5 will be stored into the PDA 3.

In the present invention, the scanning module 13 is built in the housing 1. When the PDA 3 is mounted in the housing 1, the system control resource of the PDA can be exploited to send a scan control command to the scanning module 13 for a handheld scan. In the same situation, when the base 2 is connected at the bottom of the housing 1, the scanning module 13 can automatically switch from the handheld scan mode to the automatic paper-feed scan mode. Therefore, the user of the PDA 2 can scan the required document data or pictures in real time, and can select a handheld scanning module suitable for scan of paper of A8 or A6 size or an automatic paper-feed scanning module applicable for scanning business card according to the size of the document to be scanned.

To sum up, the cradle apparatus with a built-in scanning module of the present invention has the following characteristics.

(1). After combination with a PDA, the scanning function can be accomplished through the scanning module built in the cradle apparatus to scan the required document data or pictures in real time.

(2). Both the handheld scan mode and the automatic paper-feed scan can be used, and the suitable scan mode can be selected according to the size of the document to be scanned.

(3). The cradle apparatus and the base can be selectively combined to use the same scanning module and save costs.

(4). The PDA, the cradle apparatus and the base can be separated freely to accomplish operation flexibility.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A cradle apparatus having a built-in scanning module and used for mounting a portable electronic device therein, the cradle apparatus comprising:

a housing having a connector and a transparent scanning region, the housing being connectable to said portable electronic device via said connector;

a scanning module provided in said transparent scanning region and used for scanning a document to generate an image data;

a displacement detection module provided at said housing and including a first optical detector and a second optical detector; and a base connected to the housing for automatically feeding paper to be scanned by the scanning module;

wherein said portable electronic device sends a scan control command to said scanning module via said connector, said displacement detection module detecting position and angle variations of said housing, and a scanning result is then stored in said portable electronic device.

2. The cradle apparatus with a built-in scanning module as claimed in claim 1, wherein an accommodating slot is provided in said housing for mounting said portable electronic device, and said accommodating slot includes said connector therein.

3. The cradle apparatus with a built-in scanning module as claimed in claim 1, wherein said housing has a charging module.

4. The cradle apparatus with a built-in scanning module as claimed in claim 3, wherein said charging module is composed of a charger and a rechargeable battery.

5. The cradle apparatus with a built-in scanning module as claimed in claim 1, wherein said transparent scanning region is arranged on a bottom of said housing.

6. The cradle apparatus with a built-in scanning module as claimed in claim 5, wherein said displacement detection module and said transparent scanning region are installed on the same side of said housing.

7. A cradle apparatus having a built-in scanning module and used for mounting a portable electronic device therein, the cradle apparatus comprising:
- a housing having a connector and connected to said portable electronic device via said connector, said housing having also a transparent scanning region;
- a scanning module provided in said transparent scanning region and used for scanning a document to generate an image data; and
- a displacement detection module provided at said housing and composed of a first optical detector and a second optical detector;
- a base, said base being connected with said housing, said base including an input paper tray, a roller and a motor; and
- whereby said portable electronic device sends a scan control command to said scanning module via said connector, said displacement detection module detecting position and angle variations of said housing, and a scanning result is then stored in said portable electronic device.

8. The cradle apparatus with a built-in scanning module as claimed in claim 7, wherein said housing has a fastening groove, said base has a fastening component, and said fastening component is fastened with said fastening groove to connect said housing and said base together.

9. The cradle apparatus with a built-in scanning module as claimed in claim 7, wherein said housing has a first connector, said base has a second connector, and said first connector is connected with said second connector, whereby said base receives control signals from said scanning module via said second connector and also transmits electric power.

10. The cradle apparatus with a built-in scanning module as claimed in claim 7, wherein said base has a paper-in sensor to detect a paper-feed status of said input paper tray.

11. The cradle apparatus with a built-in scanning module as claimed in claim 1, wherein said portable electronic device is a personal digital assistant.

12. The cradle apparatus with a built-in scanning module as claimed in claim 1, wherein said base includes an input paper tray for automatically feeding the paper.

13. The cradle apparatus with a built-in scanning module as claimed in claim 12, wherein said base further includes a roller and a motor.

14. The cradle apparatus with a built-in scanning module as claimed in claim 13, wherein said base further includes a paper-in sensor to detect a paper-feed status of said input paper tray.

15. The cradle apparatus with a built-in scanning module as claimed in claim 12, wherein said base further includes a paper-in sensor to detect a paper-feed status of said input paper tray.

* * * * *